United States Patent [19]

Boatwright

[11] 3,735,263

[45] May 22, 1973

[54] DIGITAL ANALYSIS OF ELECTRIC WAVE SIGNALS

[75] Inventor: John T. Boatwright, Hopkinton, N.H.

[73] Assignee: Northeast Electronics Corporation, Concord, N.H.

[22] Filed: July 12, 1972

[21] Appl. No.: 271,077

[52] U.S. Cl. ....................................................324/186

[51] Int. Cl. ..................................................G04f 9/00

[58] Field of Search ............................324/186, 78 D; 328/15; 179/175.2 A

[56] References Cited

UNITED STATES PATENTS 3,537,003 10/1970 Planta et al.............................324/186

*Primary Examiner*—Alfred E. Smith

*Attorney*—Raymond J. McElhannon

[57] ABSTRACT

Digitally measuring the duty cycle of a repetitive signal having a fractional active portion by producing and accumulating a summation of a first series of pulses of total duration equal to the period of the signal, producing and accumulating a summation of a second series of pulses of total duration equal to the active portion of the signal, reversibly counting back to zero over an interval equal to the duration of the fractional period and counting the number of pulses of the first series during the interval.

4 Claims, 1 Drawing Figure

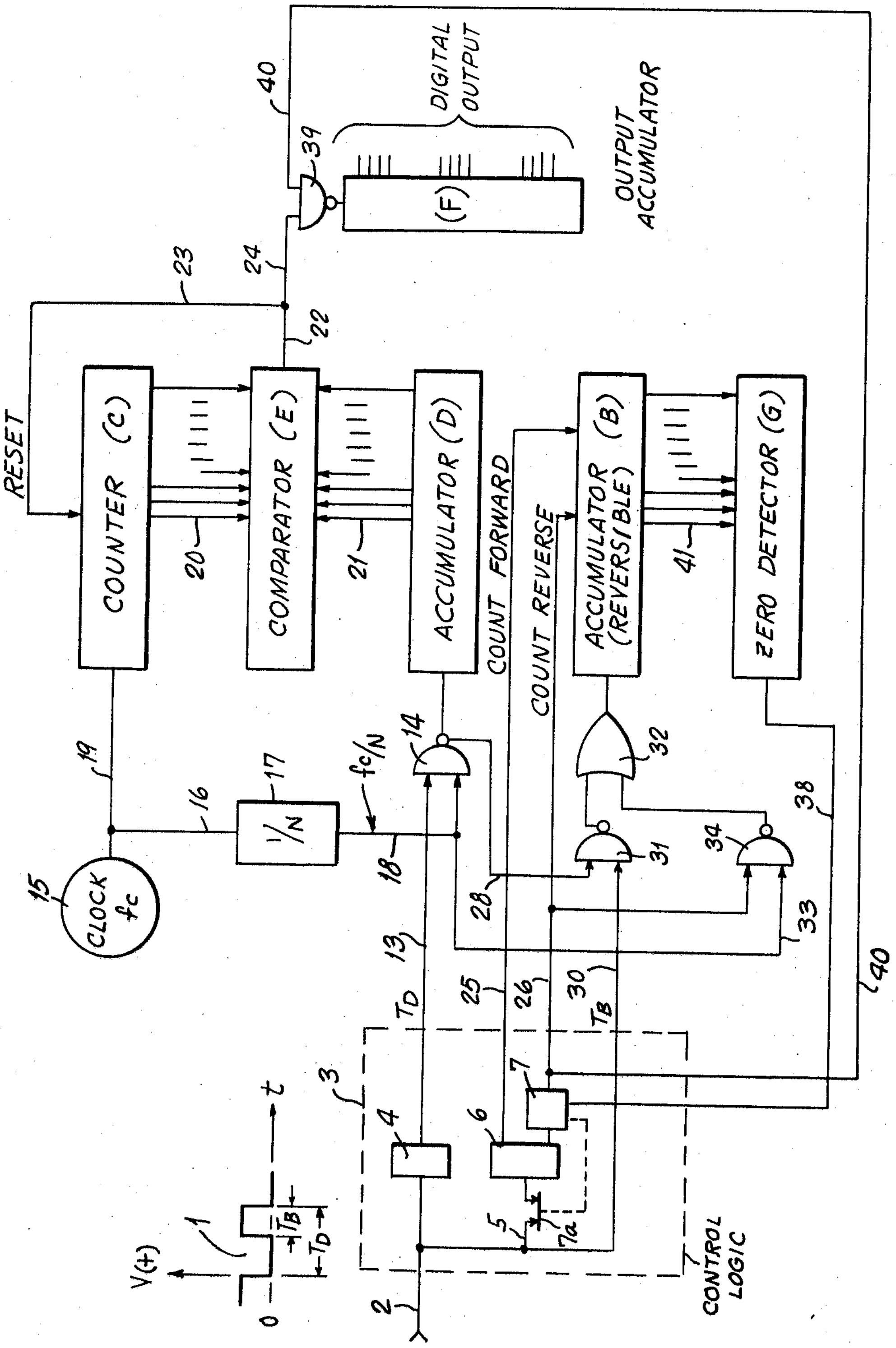
COUNTER (C)
COMPARATOR (E)
ACCUMULATOR (D)
ACCUMULATOR (REVERSIBLE) (B)
ZERO DETECTOR (G)
OUTPUT ACCUMULATOR
(F)
DIGITAL OUTPUT
RESET
COUNT FORWARD
COUNT REVERSE
CLOCK $f_c$
1/N
$f_c/N$
CONTROL LOGIC
V(+)
t
$T_D$
$T_B$

DIGITAL ANALYSIS OF ELECTRIC WAVE SIGNALS

This invention pertains to methods and apparatus for direct digital measurement and analysis of repetitive electric wave signals and more particularly for digitally measuring the percent break or active fraction of repetitive pulse wave signals.

In one of its aspects the invention provides for rapid and accurate digital measurement of the duration of such a signal or fraction thereof or for frequency adjustment thereof.

In another of its aspects the invention provides a frequency multiplier for converting a signal frequency to a preselected multiple at a higher frequency while correspondingly reducing its duration per cycle.

In still another and most important aspect the invention provides the automatic measurement and digital display of the ratio of duration of the active fraction to that of the entire period of a repetitive pulse type signal, referred to herein as the "duty cycle" or "percent break" thereof.

The last mentioned aspect of the invention finds particular application in the automatic measurement and digital display of the duty cycle of telephone dialing pulses and the like.

In telephone dialing, the duration of pulse cycles may vary considerably depending on the speed of the dialing equipment, while retaining the percent break substantially constant, inasmuch as an increase or decrease in the complete pulse cycle proportionately increases or decreases the duration of the positive pulse portion.

On the other hand in the transmission of dialing pulses over telephone lines, the percent break for the same pulse cycle duration, may vary considerably owing to distortion resulting from the transmission characteristics of the line.

The various methods and apparatus heretofore devised for measuring the percent break of dial pulse transmission over telephone lines have in general required the stationing of operators at each end of the line, the reading of meters at the receiving end and the verbal transmission of the measurement data to the sending end.

The present invention provides in one of its aspects, an automatic digital measurement of the percent break of repetitive pulse signals which may be recorded on a print out at the source of a test or automatically transmitted to a distant point and thus recorded, such as to the sending end of a line under test.

In its essentials the invention comprises a high frequency oscillator or clock for generating a measuring frequency $fc$. The clock has an output connected to a first counter for cumulatively counting the equal time intervals of successive cycles thereof. The clock output is also connected through a frequency divider for reducing the frequency by a factor of $fc/n$ transmitted to a gate, the output of which is connected to a second counter. A signal to be measured and of substantially lower frequency than $fc/n$, is impressed on the gate, which divides the signal into pulses each of duration $n/fc$. These are cumulatively counted by the second counter for the duration $T_D$ of a complete cycle of the impressed signal, at the end of which this counter locks up to hold the count which may be mathematically expressed as $$\Sigma_D = T_D \cdot fc/n \qquad (1)$$

The first and second counters feed into a comparator which emits a pulse each time the first counter driven at the clock frequency $fc$, reaches the count $\Sigma_D$ of the second counter. Each such pulse resets the first counter to zero. The comparator thus emits pulses at time intervals of $T_E$ where $$T_E = 1/fc \cdot \Sigma_D = 1/fc \cdot fc/n \cdot T_D = T_{D/n} \qquad (2)$$

The frequency fe at which these pulses are emitted from the comparator in terms of the frequency fs of the impressed signal is therefore, $$fe = n/T_D = n \cdot fs \qquad (3)$$

The apparatus as thus far described is therefore a frequency multiplier which multiplies the frequency of an impressed signal by the factor $n$, and which provides an output signal whose period is $1/n$ times the period of the input signal. This apparatus has utility, for example, in the rapid and accurate measurement of a lower frequency signal, or in the rapid and accurate adjustment of an oscillator frequency to a desired value.

There are two distinct advantages of this method of frequency multiplication as compared to prior art techniques. First, as opposed to heterodyning for example, this method provides a phase coherent signal at a precise integral multiple of the input signal. Secondly, the order of multiplication is easily accomplished by changing the number N (merely changing the number of stages in a digital divider).

Assume for example the measurement of a 60 cycle current in an alloted time of one second. With conventional measuring apparatus the precision is one part in 60. With the apparatus of the invention above described wherein the comparator output is connected to a digital display frequency measuring unit, the precision is increased by the factor $n$ in the same measuring time.

For measuring the percent break or duty cycle of a pulse wave form, such as a dialing pulse, the apparatus of the invention above described is modified as to operation and supplemented by additional apparatus as follows.

As above explained the apparatus above described measures the duration $T_D$ of a complete cycle of the received signal. Assume now that the received signal is of the pulse type having a positive portion of duration $T_B$. For measuring its duration the received signal is concurrently impressed on a gating arrangement supplied with the frequency $fc/n$ from the clock and the output of which gating arrangement is connected to a third counter which in this case is reversible in that it can count forward or backward in response to control signals transmitted thereto.

The third counter feeds into a fourth counter designated a "zero detector" having a connection extending to a digital counter or output accumulator to which the output of the comparator is also connected. The operation is such as explained more fully below that during reception of the positive portion $T_B$ of the signal it is divided by the gating assembly into pulses of duration each of $n/fc$ which are delivered to and counted forward on the reversible counter to produce a final count at which this counter locks up, as represented by the formula $$\Sigma_B = T_B \cdot fc \quad (4)$$

This count is made available to the zero detector. At this time the control logic provides a signal to the gate at the input to the digital output accumulator to activate it to receive pulses from the comparator. At the same instant the control logic activates the reversible counter to count back down to zero. When it arrives at zero, the zero detector closes the gate at the accumulator input. Since the clock frequency $fc/n$ remains the same the time required to back the reversible counter down is identical to $T_B$. During this interval a pulse train is fed from the comparator to the digital output accumulator. The interval between these pulses is $$1/fc \cdot \Sigma_D \quad (5)$$

At this rate the count stored in the output accumulator during the time interval $T_B$ that the reversible counter is backing down is $$\Sigma_O = T_B \cdot fc/\Sigma_D \quad (6)$$

But as shown in equation (1) above $$\Sigma_D = T_D \cdot fc/n \quad (1)$$

Which substituted in (6) gives $$\Sigma_O = (T_B \cdot fc/T_D \cdot fc)/n = (T_B/T_D) \cdot n \quad (7)$$

This is the final count on the digital output accumulator which thus measures the ratio of $T_B/T_D$ or the duty cycle of the received signal multiplied by $n$.

The invention will now be more fully explained by reference to the accompanying drawing comprising an electrical circuit diagram embodying the essential components and assembly thereof for practicing the invention.

Referring to the drawing, the numeral 1 designates a complete cycle of a dialing pulse plotted in volts as ordinates against time as abscissae, wherein $T_D$ designates the time duration of the complete cycle and $T_B$ the time duration of the positive portion of the cycle. The durations of $T_B$ and $T_D$ are unknown. It is desired to determine the ratio of $T_B/T_D$ termed the percent break.

In order to determine this the signal 1 is fed over a line 2 to a control logic circuit 3, which transmits the signal through a flip-flop 4, over a line 13 and through a gate 14 into an accumulator or binary counter D. The flip-flop 4 maintains the signal in line 13 positive during the entire interval $T_D$. This is accomplished by toggling the flip-flop 4 on the high to low or positive to zero transition of the signal. A clock 15 comprising a high frequency oscillator operating at a frequency of $fc$, has an output connected over a line 16 to a frequency divider 17 which divides the frequency by a factor of $n$, which is fed over a line 18 to the gate 14.

The gate divides the incoming dialing signal 1 into a series of pulses of equal time intervals each of duration or $n/fc$. The flip-flop 4 responds to the reduction of the signal voltage from plus to zero at the beginning of each cycle 10 to feed a positive signal over line 13 to the gate 14 and responds to reduction of the signal voltage from plus to zero at the end of the cycle, to cut off the signal input to gate 14. The accumulator or counter D, therefore, counts the number of pulses transmitted through gate 14 during the time interval $T_D$ and then locks up at this count which is $\Sigma_D = T_D \cdot fc/n$.

The output of the clock 15 is also connected over a line 19 to a binary counter C, and transmits thereto pulses of duration $1/fc$, which are thus counted for intervals as explained below. Interposed between the counters C and D, is a comparator E to which the counts from C and D are transmitted, as at 20 and 21. Each time the count of counter C equals the count accumulated in counter D, the comparator E transmits a pulse over line 22 and thence over a reset line 23 to the counter C which resets this counter to zero. And since as above noted the count accumulated in D is $\Sigma_D = T_D \cdot fc/n$, the interval between pulses emitted by the comparator E is equal to $1/fc \cdot \Sigma_D$ or $T_D \cdot fc/n \cdot fc = T_D/n$.

The pulses from the comparator are also transmitted over lines 22 and 24 to an output accumulator F which is a digital counter, but do not activate this counter at this time for reasons explained below.

While a count proportional to $T_D$ is being accumulated in counter D in the manner above described, a second count proportional to the time interval $T_B$ is also accumulated in an accumulator B, which is a reversible binary counter. This si is as follows referring to the drawing.

The reversible accumulator or binary counter B is controlled as to forward and reverse directions of count by signals transmitted over lines 25 and 26 from a flip-flop switch 6. The incoming signal 1 received over line 2 is impressed over a line 5 on a flip-flop switch 6, and also over a line 30 to a gate 31, and thence through a gate 32 on accumulator B. The clock frequency $fc/n$ is also impressed on gate 31 via gate 14 and line 28. During the interval that the received signal $T_B$ is positive, switch 6 is actuated to apply a positive signal to line 25 to cause counter B to count forward. Also while $T_B$ is positive the gates 31 and 32 will transmit the signal $T_B$ to accumulator B as divided into pulses each of duration $n/fc$, to cause the accumulator B to count the pulses forward to produce a total count of $\Sigma_B = T_B \cdot fc/n$ at which time accumulator B locks up.

The count from accumulator B is provided from it over lines 41 to a logic element G, designated as a "zero detector." When accumulator B locks up at the final count of $\Sigma_B = T_B \cdot fc/n$, switch 6 is actuated by transition of the incoming signal $T_B$ from plus to zero to actuate a flip-flop switch 7, to apply a positive signal over line 26 to cause accumulator B to count backwards, and also to apply a positive signal over a connection 40 to the gate 39 at the input of the output accumulator F, which causes this accumulator to start counting the pulses impressed thereon at time intervals of $1/fc \cdot \Sigma_D$, as above explained. Thus at the same instant that the control logic thus initiates this count in accumulator F, it also reverses the count in accumulator B causing it to count back down to zero during which interval the clock frequency $fc/n$ is transmitted over lines 18 and 33 and through gates 34 and 32 to accumulator B, since gate 31 transmits no signal during this interval. Since the clock frequency $fc/n$ remains the same for the count down as for the count up, the time required to back the counter B down to zero is identical to $T_B$.

Thus while accumulator B is counting back down to zero the count of $\Sigma_B = T_B \cdot fc/n$ accumulated therein, and at time intervals of $n/fc$, accumulator F is counting forward at time intervals of $1/fc \cdot \Sigma_D$. When now the accumulator B arrives at zero, a zero count is detected by the zero detector, which in turn transmits a pulse over line 38 to actuate switch 7 to disconnect the position signal from lines 26 and 40 at the zero count of accumulator B and to stop the count in accumulator F which has now registered a count equal to the ratio of $T_B/T_D \cdot n$ as above explained.

In order to prevent the signal impressed on line 5, from actuating switch 6 during the reverse count in accumulator B, switch 7 upon operation by switch 6 above explained, opens the line 5 at operate contact 7*a* of switch 7, so that line 5 remains open until switch 7 is released by the zero detector pulse received over line 38 at the end of the reverse count. This constitutes the entire measurement cycle.

Upon detection of the next transition from high (positive) to low (o) of the incoming signal 1, the control logic institutes the entire cycle again, providing thus repetitive measurements.

EXAMPLE

As illustrative of the operation of the apparatus shown in the drawing let us assume that: $T_D$ and $T_B$ equal 0.1 and 0.05 second respectively, the duty cycle being therefore ½; $fc = 100$ Kc, $n = 100$, and hence that $fc/n = 1$ Kc. The count accumulated in D is therefore $\Sigma_D = 0.1 \cdot 100{,}000/100 = 100$. The pulses from the output of comparator Eare spaced at intervals of $T_D/n = 0.1/\mathbf{100} = 0.001$ second. The count accumulated in B is $0.05 \cdot 100{,}000/100 = 50$. During the interval of 0.05 second that accumulator D is counting down from 50 to zero, the output accumulator F counts up to $T_B/(t_D/n) = T_B \cdot n/T_D = n(0.05/0.1) = n \cdot ½$, which is $n$ times the above mentioned known ratio of $T_B/T_D$ of ½.

I claim:

1. The method of automatically measuring and digitally displaying the duty cycle of a repetitive pulse signal having a fractional active portion, which comprises: generating a clock measuring frequency and gating a reduced frequency component thereof with said signal for the period of a complete cycle thereof to produce and accumulate by counting a summation of a first series of pulses of total duration equal to said period, repetitively counting pulses of said clock frequency up to the count of said summation and generating a pulse signal at the end of each count to produce a series of pulses spaced at intervals equal to said signal period divided by said reduced frequency, concurrently gating said pulse signal with said reduced frequency to produce and accumulate by counting a summation of a second series of pulses of total duration equal to that of the active fraction of said signal, reversing the order of said counting back to zero over an interval equal to the duration of said fractional period, and during said interval counting the number of pulses of said first series occurring during said interval to produce a count equal to the duty cycle of said pulse signal multiplied by said reduced frequency, and digitally displaying said count.

2. Apparatus for automatically measuring and digitally displaying the duty cycle of a repetitive pulse signal having a fractional active portion, which comprises: means for generating a clock measuring frequency, means for gating a reduced frequency component thereof with said signal for the period of a complete cycle thereof to produce and accumulate by a first counting means a summation of a first series of pulses of total duration equal to said period, a second counting means for repetitively counting pulses of said clock frequency up to the count of said summation, comparator means for said first and second counting means for generating a pulse signal at the end of each said count to reset said first counting means and to produce a series of pulses spaced at intervals equal to said signal period divided by said reduced frequency, means for concurrently gating said pulse signal with said reduced frequency to produce and accumulate by a third counting means a summation of a second series of pulses of total duration equal to that of the active fraction of said signal, means for reversing the counting order of said third counting means back to zero over an interval equal to the duration of said fractional period, and means including a digital counter for counting during said interval the number of pulses of said first series occurring during said interval to produce a count equal to the duty cycle of said pulse signal multiplied by said reduced frequency, and digitally displaying said count.

3. The method of measuring and digitally displaying the duty cycle of a repetitive pulse signal having a duration per cycle of $T_D$ and an active fractional portion of duration $T_B$, comprising: generating a clock measuring frequency $fc$, reducing a component thereof to frequency $fc/n$, gating said pulse signal over the period $T_D$ with said frequency $fc/n$ to divide said pulse signal into pulses of $n/fc$ duration each and counting said pulses, to provide an accumulated count of $\Sigma_D = T_D \cdot fc/n$, repeatedly counting said clock pulses at intervals of $n/fc$ up to that of said accumulated count and generating a pulse signal at the end of each count to produce a series of pulses spaced at intervals of $T_D/n$, concurrently and separately gating said pulse signal with said frequency $fc/n$ for the duration $T_B$ thereof to divide the same into pulses of $n/fc$ duration each and counting said pulses to an accumulated count of $\Sigma_B = T_B \cdot fc/n$, thence counting said accumulated count back down to zero over the interval $T_B$ while counting said pulses $T_D/n$ over the same interval to produce an accumulated count of the latter of the ratio $T_B/T_D \cdot n$.

4. Apparatus for automatically measuring and digitally displaying the duty cycle of a repetitive pulse signal having a duration per cycle of $T_D$ and a fractional active duty portion of duration $T_B$, comprising: a clock signal generator of frequency $fc$ and a first counter activated thereby for successive intervals of $1/fc$, gating input means for said pulse signal and a reduced frequency signal $fc/n$ from said clock generator for impressing on a second counter pulse signals each of duration $n/fc$ for the period $T_D$ of said pulse signal to provide an accumulated count therein of $\Sigma_D = T_D \cdot fc/n$, comparator means receptive of said pulses from said first and second counters for emitting a pulse each time the count in said first counter reaches the accumulated count in said second counter and for then resetting said first counter to zero thereby to produce a series of pulses spaced at intervals of $T_D/n$; a second gating means for reception of said pulse signal and said clock frequency $fc/n$ for impressing on a reversible counter pulses each of duration $n/fc$ for the duration of the active portion $T_B$ of said pulse signal for accumulating a count thereon of $\Sigma_B = T_B \cdot fc/n$, a zero detector receptive of said accumulated count for reversing the count direction of said reversible counter and for activating a digital counter to count pulses received from said comparator, said zero detector responding to a zero count down signal from said reversible counter to stop said clock, thereby to stop the count in said digital counter at a count equal to the ratio $T_B/T_D \cdot n$.

* * * * *